PARALLEL BINARY SIGNAL DIGITAL TO ANALOG CONVERTER
HAVING MAGNETICALLY SATURATED ARMATURE

Filed Dec. 20, 1965

INVENTOR.
DAVID S. SEIDEL
BY Nelson, Robbins & Anderson
ATTORNEYS

United States Patent Office 3,496,561

Patented Feb. 17, 1970

3,496,561

PARALLEL BINARY SIGNAL DIGITAL TO ANALOG CONVERTER HAVING MAGNETICALLY SATURATED ARMATURE

David S. Seidel, Granada Hills, Calif., assignor to Bell Aerospace Corporation, a corporation of Delaware Filed Dec. 20, 1965, Ser. No. 514,889
Int. Cl. H04l *3/00;* H03k *13/00*
U.S. Cl. 340—347 8 Claims

ABSTRACT OF THE DISCLOSURE

Disclosed is an apparatus for receiving binary signals in parallel form and converting the same to a position or force which is proportional to the significance of the input signals. The apparatus includes an armature having a plurality of discrete magnetically saturable areas each separated from the other by non-magnetic support means. Positioned adjacent each of the discrete magnetically saturable areas is a stator member which is adapted to receive the input binary signals. Each of the stator members include a permanent magnet which induces a magnetic field in its respective discrete area of magnetically saturable material but the induced field from the permanent magnet is of such a magnitude that the saturable discrete area is not saturated. In this manner the armature becomes sensitive to signals having less amplitude than otherwise would be possible.

This invention relates generally to digital to analog converters and more particularly to apparatus for use in such converters which apparatus is adapted to receive parallel binary signals and through the medium of magnetically saturable material to convert said signals to a position or force which is proportional to the significance of the input signals.

Digital to analog converters which receive signals, particularly in parallel binary form, have in the past been somewhat sensitive to variations in amplitude of the input signals; i.e., as the input signal amplitude varies, the mechanical position of the converter also varies in response thereto. Such variation appears as an error signal, thus causing an output to occur when such in fact is not desired. To correct such undesired output error signals apparatus was produced wherein magnetically saturable material was included in the stator mechanism to which the input signals are applied. The stator was designed in such a way that it would magnetically saturate at some predetermined current threshold level which at all times was lower than the smallest amplitude input current signal permissable in the system. Although such a device operates quite well under most circumstances it was found that certain inherent limitations were present.

Current signals available from most prior art digital apparatus are relatively small in amplitude. Therefore to produce sufficient magnetic flux to accomplish magnetic saturation in all cases a large number of turns were required on the stator cores. By having a large number of turns to accomplish the desired magnetic saturation, it was found that additional weight was added to the apparatus which, under some applications, is not desirable. Furthermore, it was also found that the dynamic response of the prior art converter units was in many applications more limited than desired.

Accordingly, it is an object of the present invention to provide a parallel binary signal receiving and converting apparatus which is more sensitive than prior art apparatus and which displays a better and less limited dynamic response to lower amplitude input signals.

It is another object of the present invention to provide a parallel binary signal receiving and converting apparatus which operates on a lower amplitude input signal than has heretofore been possible with prior art devices.

It is a further object of the present invention to provide a parallel binary signal receiving and converting apparatus which requires less turns in the stator cores to produce the desired output response to the same level input signal.

Figure 1:
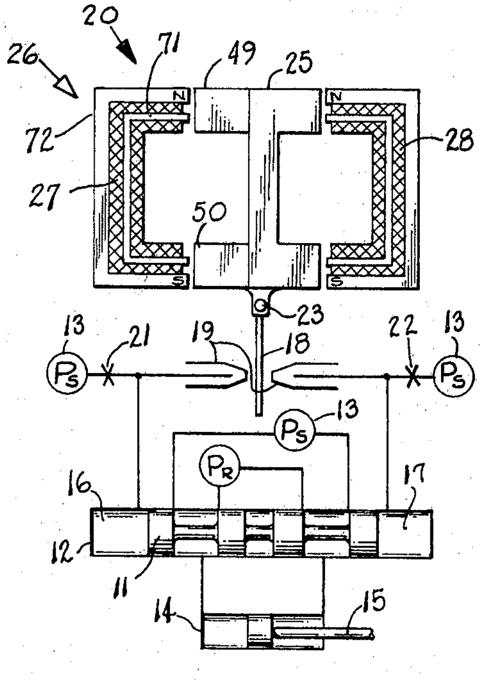

Additional objects and advantages of a parallel binary signal receiving and converting apparatus, both as to its operation and organization, as constructed in accordance with the present invention, will become apparent from a consideration of the following description taken in conjunction with the accompanying drawing which is presented by away of example only, and in which:

FIGURE 1 is a schematic diagram illustrating a parallel binary signal receiving and converting apparatus utilized in conjunction with a hydraeric servo valve as an example of one application to which a device in accordance with the present invention can be put; the term "hydraeric" as used throughout this specification and claims as defined as being generic to the concept of fluid under pressure and includes both hydraulics and pneumatics.

Figure 2:
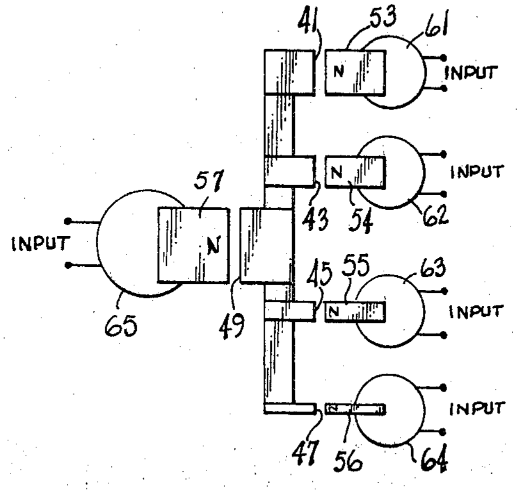
Figure 3:
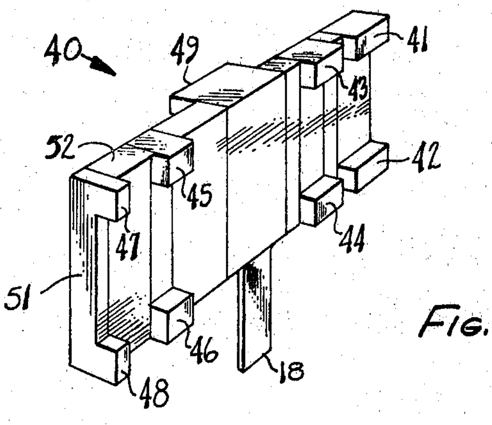

FIGURE 2 is a top plan view of a portion of the parallel binary signal receiving and converting apparatus in accordance with the present invention; and FIGURE 3 is a perspective view of the armature of a parallel binary signal receiving and converting apparatus constructed in accordance with one embodiment of the present invention.

A parallel binary signal receiving and converting apparatus in accordance with the present invention includes an armature which has a plurality of discrete magnetically sensitive areas constructed of magnetically saturable material. Stator means is included and positioned adjacent the armature means, as is well known in the prior art, and includes a plurality of magnetic cores adapted to receive parallel binary signals. Each of the stator cores is positioned adjacent a respective one of the discrete areas in the armature. The saturation characteristic of each of the discrete areas is such that the magnetic field created by signals applied to the stator cores magnetically saturates the respective discrete area.

In accordance with a specific aspect of the present invention, there is also provided a permanent magnet which is positioned adjacent the armature and which is adapted to cause the armature to respond to lower amplitude signals applied to the stator cores.

Referring now to the drawing and more particularly to FIGURE 1 thereof, there is illustrated a typical servo valve which has hydraeric fluid applied thereto and which uses apparatus in accordance with the present invention. As is shown, a spool valve 11 is slidably disposed within a bore 12. Movement of the spool valve 11 within the bore 12 controls the flow of hydraeric fluid from a source $P_s$ 13 thereof to an actuator 14. The actuator rod 15 may be connected to a load as desired in any given application. Movement of the spool valve 11 within the bore 12 is controlled by pressure differential across the end areas of the spool valve as present in the chambers 16 and 17. Such pressure in turn is controlled by the position of a flapper 18 relative to the orifices of a pair of nozzles 19 to which hydraeric fluid $P_s$ is applied as shown from sources 13 thereof, through restriction orifices 21 and 22. The position of the flapper 18 in turn is controlled by a torque motor apparatus 20. As is generally well known in the prior art. The torque motor includes armature 25 and a stator 26. Electrical signals are applied to coils 27, 28 on the stator and in response to the application of such signals the armature 25 moves about a pivot point 23 thereof, thus moving the flapper. Further and more detailed description of a servo valve and its operation is not considered necessary since such is well known in the prior art and, if desired, may be found in U.S. Patent 2,947,286.

The specific construction of the stator and armature portions of the torque motor 20 is wherein the present invention lies and more specific description thereof will now be given.

As is illustrated particularly in FIGURES 2 and 3, the armature means 40 includes a plurality of discrete areas 41 through 49 of magnetically sensitive material which is magnetically saturable and has a substantially flat saturation curve; i.e. upon a predetermined magnetic flux density being established within the material, it becomes magnetically saturated almost immediately and the characteristics thereof change almost imperceptively thereafter irrespective of being subjected to an additional magnetic field strength.

The magnetically saturable discrete areas upon the armature 40 may be constructed of elements of magnetically saturable material such as the C shaped element 51 which are then affixed to the remainder of the armature structure as illustrated at 40 in FIGURE 3. If such is desired, the elements such as illustrated at 51 may be interspersed between supporting members 52 which may if desired be of non-magnetic material. It should, of course, be understood that the elements 51 may be of any geometric configuration desired for any particular application and the supporting elements 52 may be constructed of any material desired in any given application. The manner in which the elements 51 are supported upon the support portions 52 of the armature 40 may be any which is known to the art, such as by adhesives, bolts, welding, brazing or the like.

Affixed to the lower central portion of the armature 40 is a flapper 18 which occupies the position above referred to in connection with FIGURE 1 and operates in the manner therein indicated.

Positioned adjacent each of the discrete areas 41 through 49 is a stator pole piece such as illustrated at 53 through 57. Each of the stator pole pieces 53 through 57 has a coil 61 through 65 respectively wound thereon. Each of the coils is adapted to receive an input signal as is indicated by the pair of terminals affixed thereto in each case. Each of the coils 61 through 65 has applied to the input terminals thereof one bit of a binary word which is applied in parallel fashion thereto. It should be noted that the stator pole pieces 53 through 57 as well as the discrete magnetically sensitive areas on the armature 41 through 49 have differing areas. These areas are chosen in such a manner as to accomplish the desired binary weighting depending upon the significance of the particular binary bit in the binary word as applied. Further description of such weighting and the binary code is not deemed necessary since such is known in the prior art.

Each of the stator pole pieces 53 through 57 is constructed, for example referring to FIGURE 1, of a core 71 upon which there is wound a coil such as illustrated at 27. Upon the application of a signal to the coil 27, a magnetic field is induced in the core 71 and is further induced in the discrete magnetic sensitive and saturable area 49 of the armature discrete magnetically sensitive element as above described. Also positioned adjacent the armature discrete magnetically saturable area 49 is a permanent magnet 72. The permanent magnet is arranged in such a manner that a quiescent magnetic field is produced in the discrete areas 49–50 of the armature element. By establishing such a quiescent magnetic flux in the magnetically saturable areas 49–50, a lesser amplitude signal may be applied to the coil 27 and a smaller magnetic field is required to bring the magnetically saturable discrete areas 49–50 to magnetic saturation.

The permanent magnet may be associated with the armature means 40 in any manner which is desired, taking into consideration various design factors for any application. One such manner in which this may be accomplished is as illustrated in FIGURE 1. By utilizing the winding 28 to space the permanent magnet from the core 71 it can be seen that the core 71 is precluded from shorting out the magnetic field produced by the permanent magnet 72. Other obvious arrangements of the permanent magnet in conjunction with the armature elements of magnetically saturable material will become apparent to those skilled in the art without departing from the scope or spirit of the present invention.

There has thus been disclosed apparatus for receiving parallel binary signals and converting the same into a mechanical position which is simple, dynamically responsive to lower input signals than such prior art apparatus, and overcomes other and various disadvantages of similar prior art apparatus. Although the apparatus in accordance with the present invention has been disclosed and described in some detail in the embodiment thereof shown and described therein, such is to be taken by way of illustration only and not as a limitation upon the scope of the claims appended hereto.

What is claimed is:

1. In a digital to analog converter, apparatus for receiving parallel binary signals from a source thereof and converting the same to a position proportional to said signals, said apparatus comprising:

armature means mounted to pivot about a pivot point thereof, said armature means including a plurality of discrete magnetically saturable areas separated by areas of non-magnetic material; and stator means including a plurality of magnetic cores having windings thereon adapted to receive said signals and generate a magnetic field in response thereto, each of said cores being positioned adjacent a respective one of said discrete areas, the saturation characteristic of each of said discrete areas being such that said magnetic field magnetically saturates said discrete area.

2. Apparatus for receiving and converting parallel binary signals as defined in claim 1 in which said armature means is constructed of non-magnetic material and said discrete areas are elements of magnetically saturable material affixed to said non-magnetic material.

3. Apparatus for receiving and converting parallel binary signals as defined in claim 1 which further includes permanent magnet means positioned adjacent said armature means and inducing a quiescent magnetic field in a portion of said armature means.

4. Apparatus for receiving and converting parallel binary signals as defined in claim 3 in which said permanent magnet means is a separate permanent magnet positioned adjacent each of said discrete areas.

5. Apparatus for receiving and converting parallel binary signals as defined in claim 4 in which each of said magnetic cores includes said permanent magnet means positioned adjacent its respective discrete area, each said permanent magnet means inducing a magnetic field in said respective discrete area of a magnitude less than that required to saturate said discrete area.

6. Apparatus for receiving and converting parallel binary signals as defined in claim 5 in which said windings on said cores are positioned between and space apart said core and said permanent magnet means to substantially magnetically isolate said core and said permanent magnet.

7. Apparatus for receiving and converting parallel binary signals as defined in claim 6 in which said armature means includes discrete elements of magnetically saturable material independently affixed to a non-magnetic support member.

8. Apparatus for receiving and converting parallel binary signals as defined in claim 7 in which said support member is a flat plate-like member and said discrete elements are spaced therealong.

References Cited

UNITED STATES PATENTS 3,071,714 1/1963 Hadekel ------------ 335—227

3,225,346 12/1965 Buddenhagen ------- 340—347

MAYNARD R. WILBUR, Primary Examiner

JEREMIAH GLASSMAN, Assistant Examiner